United States Patent [19]
Debaye

[11] 3,908,700
[45] Sept. 30, 1975

[54] SOLENOID VALVE
[75] Inventor: Jean Debaye, Montesson, France
[73] Assignee: Societe Anonyme des Establissements Jouvenel & Cordier, France
[22] Filed: May 3, 1974
[21] Appl. No.: 466,902

[30] Foreign Application Priority Data
Sept. 5, 1973  France .............................. 73.32023

[52] U.S. Cl. ............. 137/625.65; 251/129; 251/139
[51] Int. Cl.² .......................................... F16K 31/06
[58] Field of Search ................... 251/141, 129, 139; 137/625.65

[56] References Cited
UNITED STATES PATENTS
2,238,401   4/1941   Shaw .............................. 251/129 X
2,999,192   9/1961   Lambert ......................... 251/129 X
3,012,581   12/1961  Wilson ............................ 251/139 X FOREIGN PATENTS OR APPLICATIONS
33,074   11/1964   Germany ........................... 251/141

*Primary Examiner*—Arnold Rosenthal
*Attorney, Agent, or Firm*—Wenderoth, Lind & Ponack

[57] ABSTRACT

Solenoid valve of the type comprising a magnetic head supporting the solenoid, a body having fluid inlets and outlets formed therein, and a spring-urged magnetic core, this valve being characterized in that the magnetic yoke comprises a relatively narrow phase-shifting ring retained by an external sleeve.

3 Claims, 5 Drawing Figures

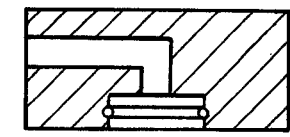
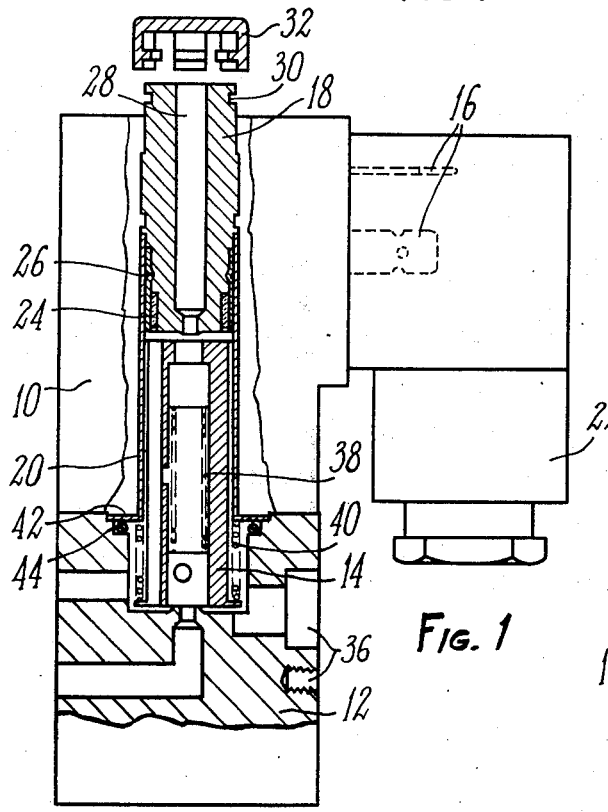
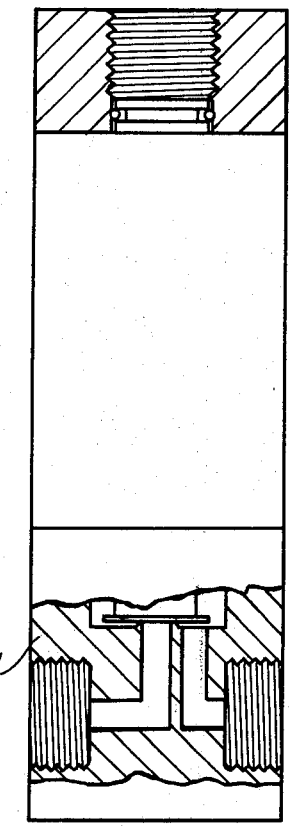
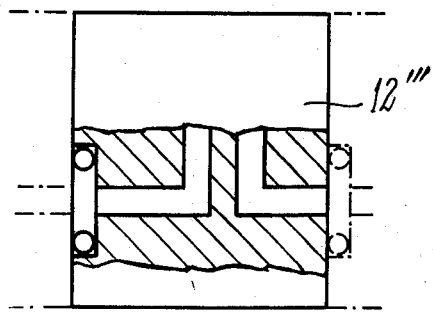
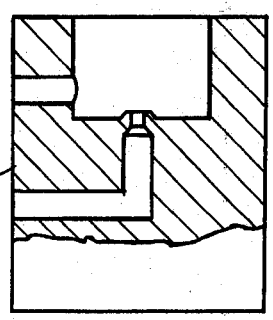

SOLENOID VALVE

BACKGROUND OF THE INVENTION

The present invention relates in general to a solenoid valve, and more particularly to an electromagnetic valve device of this type intended notably for pneumatic or hydraulic systems.

SUMMARY OF THE INVENTION

The solenoid valve of the invention is of the type comprising three sub-assemblies, namely a magnetic head carrying the solenoid, a valve body having fluid inlets and outlets, and a magnetic core urged by a spring. The magnetic yoke includes a narrow phase-shifting ring retained by an external and likewise magnetic sleeve, and the yoke has in the upper portion thereof a groove adapted to receive either a protection cap or a fluid fitting retained by a snap action means or secured by means of the assembling screws of the solenoid valve.

BRIEF DESCRIPTION OF THE DRAWINGS

Other features and advantages of this invention will appear as the following description proceeds, with reference to the attached drawings, in which:

FIG. 1 is a vertical section with parts broken away, showing a typical embodiment of a solenoid valve according to this invention;

FIG. 1a illustrates a fluid fitting usable in place of the protection cap shown in FIG. 1;

FIG. 2 is a detail view showing modifications of the embodiment of FIG. 1; and,

FIGS. 3 and 4 are part-sectional views showing further modifications of the body of the solenoid valve of this invention.

DETAILED DESCRIPTION OF THE INVENTION

As mentioned above, the solenoid valve of the invention comprises three sub-assemblies, i.e. a magnetic head 10 carrying the solenoid in a known manner, the valve body 12, and the magnetic core 14.

The magnetic head 10 consists of a block comprising the following elements: a known solenoid (not shown) including a winding with its connecting terminals 16, a known magnetic circuit, a magnetic yoke 18 and a non magnetic sheath 20 for isolating the preceding elements from the controlled fluid.

The connecting terminals 16 of the solenoid are so disposed that they can accommodate an electric connector 22 of any standard type. The magnetic yoke 18 comprises, according to this invention, a relatively narrow phase-shifting ring 24 retained in a magnetic sleeve 26, this arrangement facilitating the construction of the assembly.

The yoke may be provided with an axial passage 28 for the fluid, and its upper portion has therein a groove 30 adapted to receive by snap-action either a protection cap 32 or a fluid connecting fitting 34 (see FIG. 1a). According to a modified embodiment of this invention, either of these two members may also be kept in position by means of the assembling screws of the solenoid valve.

The valve body 12 consists preferably of a unitary casting and may be made in various ways, for example with internally-threaded inlet and outlet 12' (FIG. 2), with flat-fitting inlet and outlet 12'' (FIG. 4), or with juxtaposed inlet and outlet 12''' (FIG. 3). This body 12 also comprises a cavity adapted to receive an ancillary component such as, for instance, a mechanical device for actuating the core in case of current failure, a pressure tell-tale device, a core-position detector, etc.

The magnetic core 14 comprises an internal coil compression spring 38 for closing the magnetic circuit completely when the upper valve seat (if provided) is closed. Another spring 40 constantly urges the core 14 to a position to close the lower valve seat when the solenoid is de-energized.

The valve body 12 and the head 10, when assembled, clamp an O-ring 44 adapted to seal the assembly with respect to the outside, an annular flange 42 formed integrally with the lower portion of the sheath 20 insulating the coated portion of the solenoid and the magnetic circuit.

Of course, many modifications may be made to the various embodiments shown and described herein, without departing however from the basic principles of the invention as set forth in the appended claims.

What is claimed is:

1. A solenoid electro-valve comprising:
   a valve body having therein a first valve seat separating a fluid inlet from a fluid outlet;
   a unitary magnetic head including a solenoid winding and a magnetic circuit, said head being attached to said valve body, said head forming a core receiving chamber with said valve body;
   a magnetic yoke extending through said head from exterior thereof to said chamber, said yoke having an axial passage extending therethrough and a second valve seat;
   a magnetic core positioned in said chamber and having thereon first and second valves for respective engagement with said first and second valve seats;
   spring means for normally urging said core to cause said first valve to close said first valve seat;
   a narrow phase-shifting ring means surrounding a portion of said magnetic yoke positioned completely interiorly of said head for introducing a magnetic phase shift in said magnetic circuit; and
   a magnetic sleeve retaining said ring means on said magnetic yoke.

2. A solenoid electro-valve as claimed in claim 1, wherein said magnetic yoke has an outermost portion thereof extending exteriorly of said head, said portion having therein an outer annular groove.

3. A solenoid electro-valve as claimed in claim 1, wherein said ring means surrounds said magnetic yoke at a portion thereof spaced from the exterior of said head.

* * * * *